Patented Mar. 23, 1948

2,438,340

UNITED STATES PATENT OFFICE 2,438,340

LOW TEMPERATURE POLYMERIZATION OF OLEFINIC HYDROCARBONS

Herbert L. Johnson, Norwood, Pa., assignor to Sun Oil Company, Philadelphia, Pa., a corporation of New Jersey No Drawing. Application April 27, 1944,
Serial No. 533,061

2 Claims. (Cl. 260—86)

The present invention relates to polymerization reactions particularly to low temperature polymerization of olefinic hydrocarbons with the aid of aluminum bromide as a catalyst. More particularly the present invention is concerned with the interpolymerization of a 3 component monomeric mixture of olefinic hydrocarbons employing aluminum bromide previously dissolved in a saturated hydrocarbon liquid as will appear more fully hereinafter.

The polymerization of olefinic hydrocarbons at temperatures below 10° C., for instance within the range of −100° C. to 0° C., in the presence of a Friedel-Crafts type catalyst is well known to the art. This type of reaction has been utilized to produce from low molecular weight hydrocarbons high molecular weight materials varying widely in character, including viscous oils, thermoplastic resins and elastic or rubbery products. In such reactions long chain molecules are formed which may cross link to varying degree, and the type of product obtained depends mainly on the length of the molecular chain·and the amount of cross linking which takes place during the reaction. As examples of such reactions may be mentioned the polymerization of olefins and particularly iso-olefins such as isobutylene and other low molecular weight iso-olefins having a double bond in the alpha position and a side chain in the beta position; the interpolymerization of isobutylene or other iso-olefins with conjugated diolefin such as butadiene, isoprene, cyclopentadiene, piperylene, hexadienes, chloroprene and the like; the interpolymerization of isobutylene or other iso-olefins with aryl compounds containing a vinyl group as, for instance, styrene, indene, substituted vinyl benzenes, vinyl naphthalenes and like reactants; and the interpolymerization of conjugated diolefins with aryl compounds containing a vinyl group. More recently, three component copolymers formed at low temperatures by the interpolymerization of an iso-olefin, a conjugated diolefin and an aryl compound containing a vinyl group—for example, isobutylene, butadiene and styrene—have been described in the applications of Stewart S. Kurtz, Jr., Serial No. 487,817, filed May 20, 1943, now abandoned, and Serial No. 596,099, filed May 26, 1945.

Numerous Friedel-Crafts catalysts have been proposed for use in effecting reactions of the aforesaid type but of these only boron fluoride and aluminum chloride have been employed to any wide extent. Boron fluoride is a gas and accordingly affords certain operating advantages including ease of addition to the reaction mixture and ease of removal from the reaction products. Aluminum chloride, on the other hand, is a more powerful catalyst than boron fluoride and therefore is capable of effecting a greater degree of polymerization, permitting attainment of higher yields of products and the preparation of products of higher molecular weight. However, since aluminum chloride is a solid and is only slightly soluble in hydrocarbons, results obtained by adding it in solid form to the reaction mixture have not been particularly satisfactory. When working in this manner the aluminum chloride is apt to become coated rapidly with the reaction product and thus become ineffective to promote the polymerization satisfactorily. Furthermore, this manner of operating may result in failure to accomplish any practical amount of polymerization when the operation is conducted at extremely low temperatures. It therefore has been found necessary or highly desirable when using aluminum chloride first to dissolve it in a suitable solvent medium and then to use the resulting solution as the catalytic agent. This overcomes the aforementioned difficulties and permits better control over the progress of reaction and quality of product obtainable. Numerous organic substances have been suggested as solvents for this purpose and these, in general, have been of the type which forms a complex through some sort of loose chemical union of the solvent with the aluminum chloride. Of the solvents proposed, alkyl halides, particularly monohalides such as methyl chloride or ethyl chloride, have proved most satisfactory. The particular suitability of the alkyl halides has been accounted for by the formation of an aluminum chloride-alkyl halide complex which is presumed to function, of itself, as an effective catalyst or by interaction of the aluminum chloride and alkyl halide to form small amounts of hydrogen halide which is known to improve catalytic activity. Since such solvents are relatively expensive, it is necessary in large scale operations to provide means for their recovery and reuse.

Aluminum bromide also has been proposed as a catalyst for low temperature polymerization reactions and, in fact, heretofore has been considered as the equivalent of aluminum chloride. Accordingly, when working with aluminum bromide, it has been recommended that the same type of solvents as employed with aluminum chloride be used, i. e. solvents which form a complex with the catalyst, particularly alkyl halides.

In accordance with the present invention, a saturated hydrocarbon or mixture of such hydrocarbons is utilized as the solvent for aluminum bromide. I have found that saturated hydrocarbons, although being poor solvents for aluminum chloride, have a high solvency for aluminum bromide. Furthermore, I have discovered that a solution of aluminum bromide in a saturated hydrocarbon material is an effective catalyst for the low temperature polymerization reactions mentioned in the aforesaid application of Stewart S. Kurtz, Serial No. 596,099, filed May 26, 1945, particularly the interpolymerization of isobutylene, butylene and styrene. Aluminum chloride, on the other hand, cannot be suitably employed in this manner due to its low solubility. Thus, in contrast to previous experience in the use of these catalytic agents, according to the invention aluminum bromide and aluminum chloride are not equivalent. In further contrast, the solvents of the present invention do not form a complex with the catalyst or undergo any other discernible reaction therewith. Furthermore, the solvents are relatively inexpensive as compared to the solvents heretofore recommended.

Thus, according to the present invention an olefinic hydrocarbon monomeric mixture consisting of isobutylene, butadiene and styrene is polymerized employing a previously prepared solution of aluminum bromide dissolved in a saturated hydrocarbon liquid.

In preparing the aluminum bromide solution, any aliphatic or saturated cyclic hydrocarbon which will be soluble in the reaction mixture at the polymerization temperature at which the reaction is carried out may be employed as the solvent. For example, the solvent may be propane, butane, isobutane, pentane, isopentane, cyclopentane, hexane, cyclohexane, heptane, octane, etc., or a mixture of such hydrocarbons such as a petroleum naphtha free of unsaturated hydrocarbons. It is advantageous to prepare the catalyst solution at room temperature or at moderately elevated temperatures in order to facilitate solution of the aluminum bromide and, accordingly, is desirable to use as the solvent a saturated hydrocarbon of sufficiently high boiling point that the solvent need not be maintained under pressure while solution is being effected. It is also desirable that the boiling point of the solvent be not too high in order that it may be easily removed from the reaction product. Hexanes or heptanes are examples of solvents with particularly convenient boiling points.

One manner of carrying out the polymerization comprises cooling the olefinic hydrocarbon reactants to the desired polymerizing temperature and passing into the reaction mixture a previously prepared solution of aluminum bromide dissolved in saturated hydrocarbon material. The catalyst solution preferably is added at controlled rate to regulate the rate of reaction as desired. The reaction temperature may be maintained at the desired level in any suitable manner and conveniently by employing an inert diluent, such as ethylene, ethane or propane, which serves as a refrigerant by evaporation.

It is advantageous to employ as the solution of catalyst and saturated hydrocarbon a relatively concentrated mixture in order to minimize the amount of saturated hydrocarbon to be recovered from the reaction product. A solution containing at least 2 per cent aluminum bromide by weight is desirable, while a solution containing at least 5 per cent is preferable. Such concentrations are possible due to the relatively high solubility of aluminum bromide in the specified solvents. By way of comparison aluminum chloride is soluble in saturated hydrocarbons only to the extent of about 0.2–0.3 per cent at room temperature.

The following examples, in which parts are by weight, serve to illustrate one manner of practicing the invention:

Example I

A catalyst solution was prepared by dissolving 7 per cent AlBr₃ in n-heptane at room temperature. This solution was used to effect polymerization of a mixture of monomers consisting of 60 parts isobutylene, 20 parts butadiene and 20 parts styrene, to which was added 400 parts propane. The latter served as a refrigerant and, by evaporation, maintained the temperature during reaction at approximately −40° C. The rate of addition of catalyst solution was regulated to give an approximately constant polymerization rate as judged by the rate of evolution of propane from the reaction mixture. A total of 3 parts of AlBr₃ was added over a period of about 15 minutes. Low boiling constituents were then removed from the reaction mixture by evaporation and the catalyst was inactivated by mixing the polymerization product with water, after which the product was dried. A yield of 75 parts of vulcanizable rubbery product having a penetration of 135 substantially according to A. S. T. M. procedure D5–25 was obtained.

Example II

The present example was carried out in a manner similar to Example I but in this case the reactants consisted of 30 parts isobutylene, 50 parts butadiene, 20 parts styrene and 81 parts of refinery C₄ fraction having the following composition by weight:

| | Per cent |
|---|---|
| C₃ hydrocarbons | 1.2 |
| Isobutane | 24.6 |
| Isobutylene | 8.5 |
| n-Butylenes | 29.8 |
| n-Butane | 26.9 |
| C₅ hydrocarbons | 9.0 |
| Total | 100.0 |

Thus, on a percentage basis there was present 35% by weight of isobutylene, 47% by weight of butadiene and 18% styrene. The same catalyst solution was employed and a total of 6 parts of AlBr₃ was used. Seventy-nine parts of vulcanizable rubber-like product having a penetration of 72 was obtained.

Example III

This example differs from Example II only in that a total of 12 parts of AlBr₃ instead of 6 parts was used. This amount of catalyst gave a yield of 106 parts of vulcanizable rubbery product with a penetration of 77.

It is evident from the foregoing examples that the invention is suited to the interpolymerization of monomeric mixtures containing 35%–60% isobutylene, 20%–45% butadiene and the remainder styrene.

In carrying out reactions of the type in the foregoing examples, it has been found that the use of aluminum bromide in the described manner results in the formation of products closely resembling those obtained when the catalyst is aluminum chloride dissolved in ethyl chloride, provided the aluminum bromide and aluminum chloride are employed on an equal molar basis. Furthermore, substantially the same yields are obtained with either catalyst. This shows that aluminum bromide dissolved in a saturated hydrocarbon is as powerful a catalyst as aluminum chloride dissolved in an alkyl halide, in spite of the fact that the aluminum bromide and saturated hydrocarbon do not form a complex and do not appear to interact to liberate hydrogen halide.

It is contemplated that the present invention is applicable to any polymerization reaction carried out with the aid of aluminum bromide at temperatures below about 10° C., in which relatively low molecular weight olefinic hydrocarbons are transformed into long chain polymers of high molecular weight, regardless of the specific type of product obtained.

I claim:

1. In a process wherein a polymerizable olefinic hydrocarbon monomeric mixture consisting of 35%-60% by weight of isobutylene, 20%-45% by weight of butadiene and the remainder of styrene is polymerized at a temperature of minus 40° C. to form polymers of high molecular weight, the step of utilizing as a catalyst a previously prepared solution of aluminum bromide dissolved in a saturated hydrocarbon liquid.

2. Process according to claim 1 wherein said solution contains 2%-12% aluminum bromide by weight.

HERBERT L. JOHNSON.

REFERENCES CITED

The following references are of record in the file of this patent:

UNITED STATES PATENTS

| Number | Name | Date |
|---|---|---|
| 2,278,934 | Lee | Apr. 7, 1942 |
| 2,288,477 | Montgomery | June 30, 1942 |
| 2,317,878 | Bannon | Apr. 27, 1943 |
| 2,348,770 | Welinsky | May 16, 1944 |

FOREIGN PATENTS

| Number | Country | Date |
|---|---|---|
| 505,736 | Great Britain | May 16, 1939 |
| 509,463 | Great Britain | July 17, 1939 |

OTHER REFERENCES

Glasebrook et al.: J. Am. Chem. Soc., 58 pp. 1944-46, Oct. 1936.